(12) United States Patent
Micheaux et al.

(10) Patent No.: US 8,382,467 B2
(45) Date of Patent: Feb. 26, 2013

(54) MULTIPLE PART MANDREL

(75) Inventors: Dominique Micheaux, Sanary sur Mer (FR); Pierre Valibouse, Le Revest les Eaux (FR); Philippe Marino, Ollioules (FR); Denis Colombo, Sanary sur Mer (FR)

(73) Assignee: Constructions Industrielles de la Mediterranee—CNIM, Paris (FR)

( * ) Notice: Subject to any disclaimer, the term of this patent is extended or adjusted under 35 U.S.C. 154(b) by 705 days.

(21) Appl. No.: 12/445,468

(22) PCT Filed: Oct. 23, 2006

(86) PCT No.: PCT/FR2006/002375
§ 371 (c)(1),
(2), (4) Date: Jun. 22, 2009

(87) PCT Pub. No.: WO2008/049975
PCT Pub. Date: May 2, 2008

(65) Prior Publication Data
US 2010/0032862 A1    Feb. 11, 2010

(51) Int. Cl.
*B29C 33/48* (2006.01)
(52) U.S. Cl. ........ 425/403; 425/112; 425/392; 425/393; 425/502; 249/63; 249/96; 249/176; 249/177
(58) Field of Classification Search .................. 425/112, 425/117, 123, 385, 392, 393, 403, 470, 500, 425/501, 502; 249/63, 96, 155, 158, 175, 249/176, 177; 264/257, 258, 510, 512
See application file for complete search history.

(56) References Cited

U.S. PATENT DOCUMENTS

| | | | | |
|---|---|---|---|---|
| 4,397,048 A * | 8/1983 | Brown et al. | ............... | 623/27 |
| 4,780,262 A * | 10/1988 | VonVolkli | .................. | 264/512 |
| 4,882,118 A * | 11/1989 | Megarry | .................... | 264/510 |
| 5,022,845 A * | 6/1991 | Charlson et al. | ............. | 425/403 |
| 5,071,338 A * | 12/1991 | Dublinski et al. | ........... | 425/403 |
| 5,106,290 A * | 4/1992 | Carver et al. | ............... | 425/470 |
| 5,131,834 A * | 7/1992 | Potter | ........................ | 425/389 |
| 5,173,315 A * | 12/1992 | Charlson et al. | ............. | 425/403 |
| 5,217,669 A * | 6/1993 | Dublinski et al. | ........... | 264/258 |
| 5,242,523 A * | 9/1993 | Willden et al. | .............. | 156/285 |
| 5,266,137 A * | 11/1993 | Hollingsworth | ............ | 156/156 |
| 5,382,150 A * | 1/1995 | Henrio | ......................... | 425/390 |

(Continued)

FOREIGN PATENT DOCUMENTS

EP    0 394 934 A1    10/1990

*Primary Examiner* — Joseph Del Sole
*Assistant Examiner* — Seyed Masoud Malekzadeh
(74) *Attorney, Agent, or Firm* — Leydig, Voit & Mayer, Ltd.

(57) ABSTRACT

A multiple part mandrel on which a hollow body may be formed includes multiple sectors. Each sector has a skin on an outer face and a pair of opposed side returns at longitudinal sides of the sector. The mandrel formed by the sectors is symmetrical about a central axis of the mandrel. When the sectors are assembled as the mandrel, the side returns of adjacent sectors face each other. Each of the side returns includes a recess in an outside surface of the side return, spaced from the skin of the respective sector, and an inflatable O-ring disposed in the recess. The recesses of adjacent side returns in the mandrel are offset with respect to each other in an axial direction of the mandrel. Inflation of the inflatable O-rings urges adjacent sectors together at the skins of the sectors to seal the adjacent sectors at the skins.

8 Claims, 4 Drawing Sheets

U.S. PATENT DOCUMENTS

| | | | |
|---|---|---|---|
| 5,403,537 A * | 4/1995 | Seal et al. | 264/511 |
| 5,484,277 A * | 1/1996 | Lindsay | 425/388 |
| 5,622,733 A * | 4/1997 | Asher | 425/504 |
| 5,746,553 A * | 5/1998 | Engwall | 409/132 |
| 6,012,883 A * | 1/2000 | Engwall et al. | 409/132 |
| 6,071,460 A * | 6/2000 | Renaudin et al. | 264/314 |
| 6,168,358 B1 * | 1/2001 | Engwall et al. | 409/219 |
| 6,589,472 B1 * | 7/2003 | Benson et al. | 264/510 |
| 6,692,681 B1 * | 2/2004 | Lunde | 264/510 |
| 6,814,563 B2 * | 11/2004 | Amnered et al. | 425/389 |
| 7,028,972 B2 * | 4/2006 | Miller et al. | 249/63 |
| 7,134,629 B2 * | 11/2006 | Johnson et al. | 244/119 |
| 7,141,191 B2 * | 11/2006 | Engwall et al. | 264/40.1 |
| 7,159,822 B2 * | 1/2007 | Grantham et al. | 244/119 |
| 7,166,251 B2 * | 1/2007 | Blankinship | 264/258 |
| 7,228,611 B2 * | 6/2007 | Anderson et al. | 29/448 |
| 7,462,321 B2 * | 12/2008 | Udin | 264/553 |
| 7,503,368 B2 * | 3/2009 | Chapman et al. | 156/425 |
| 7,827,665 B2 * | 11/2010 | Happel et al. | 29/402.02 |
| 2003/0025235 A1 * | 2/2003 | Takagi | 264/154 |
| 2003/0189268 A2 * | 10/2003 | Takagi | 264/154 |
| 2005/0102814 A1 * | 5/2005 | Anderson et al. | 29/455.1 |
| 2006/0113706 A1 * | 6/2006 | Chevin et al. | 264/258 |
| 2006/0249868 A1 * | 11/2006 | Brown et al. | 264/163 |

* cited by examiner

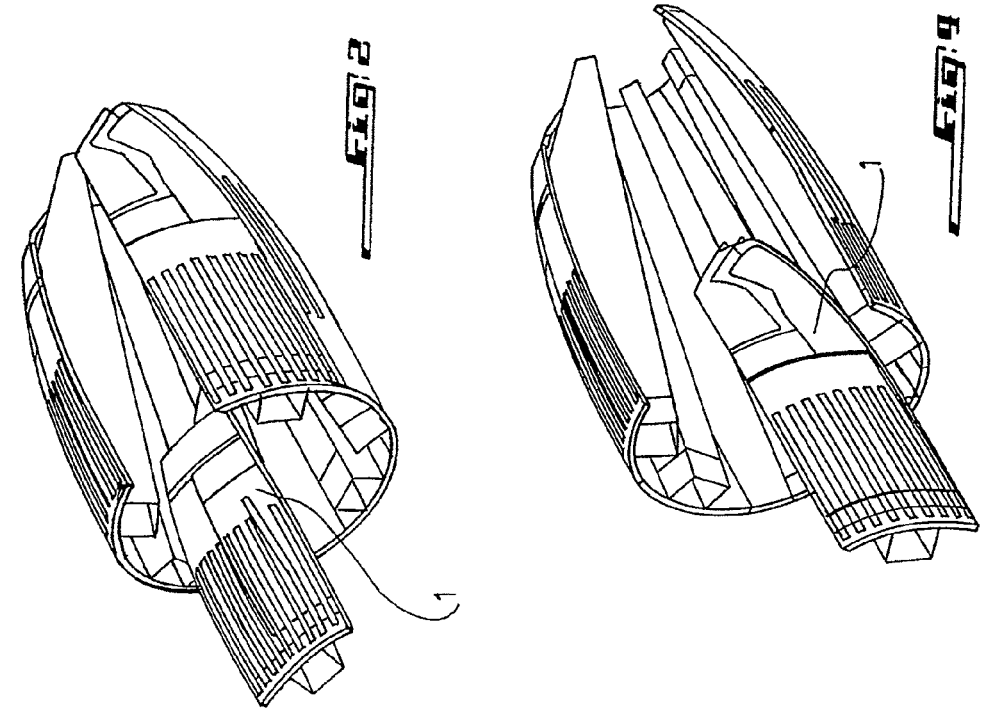
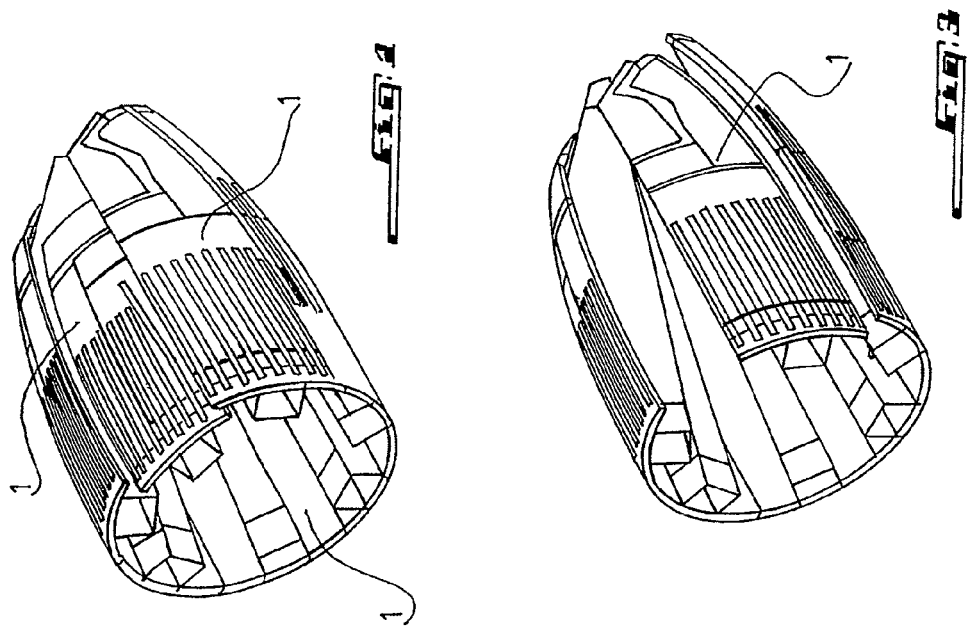

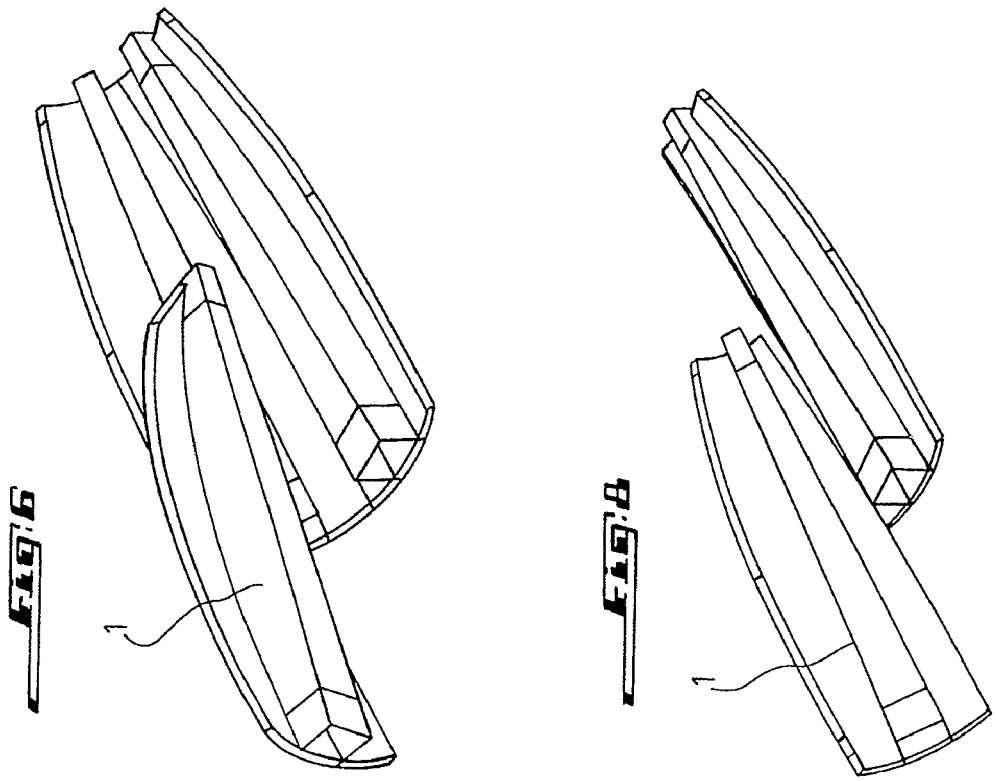
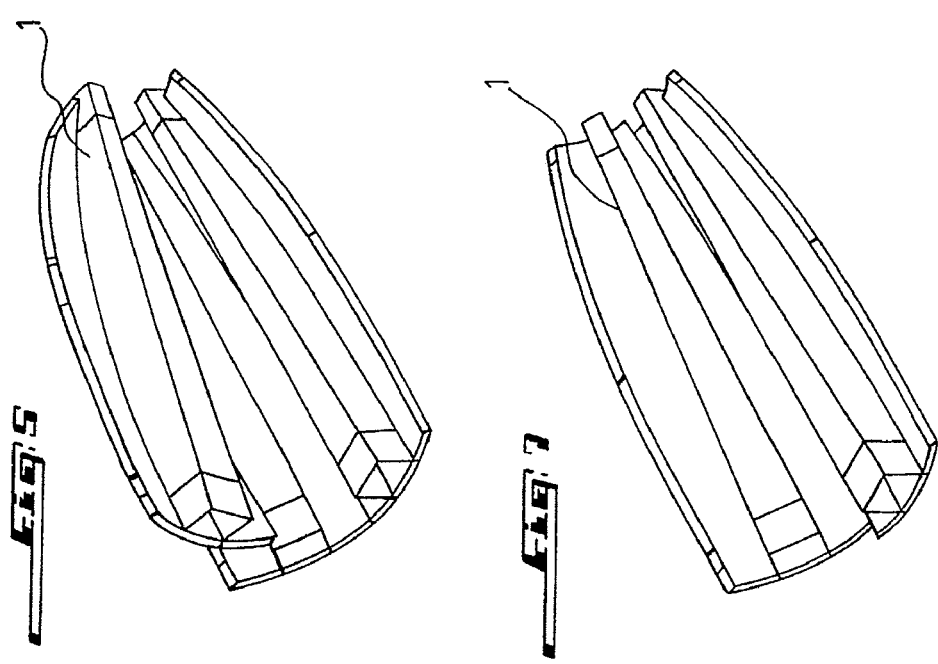
Fig. 5  Fig. 7  Fig. 6  Fig. 8

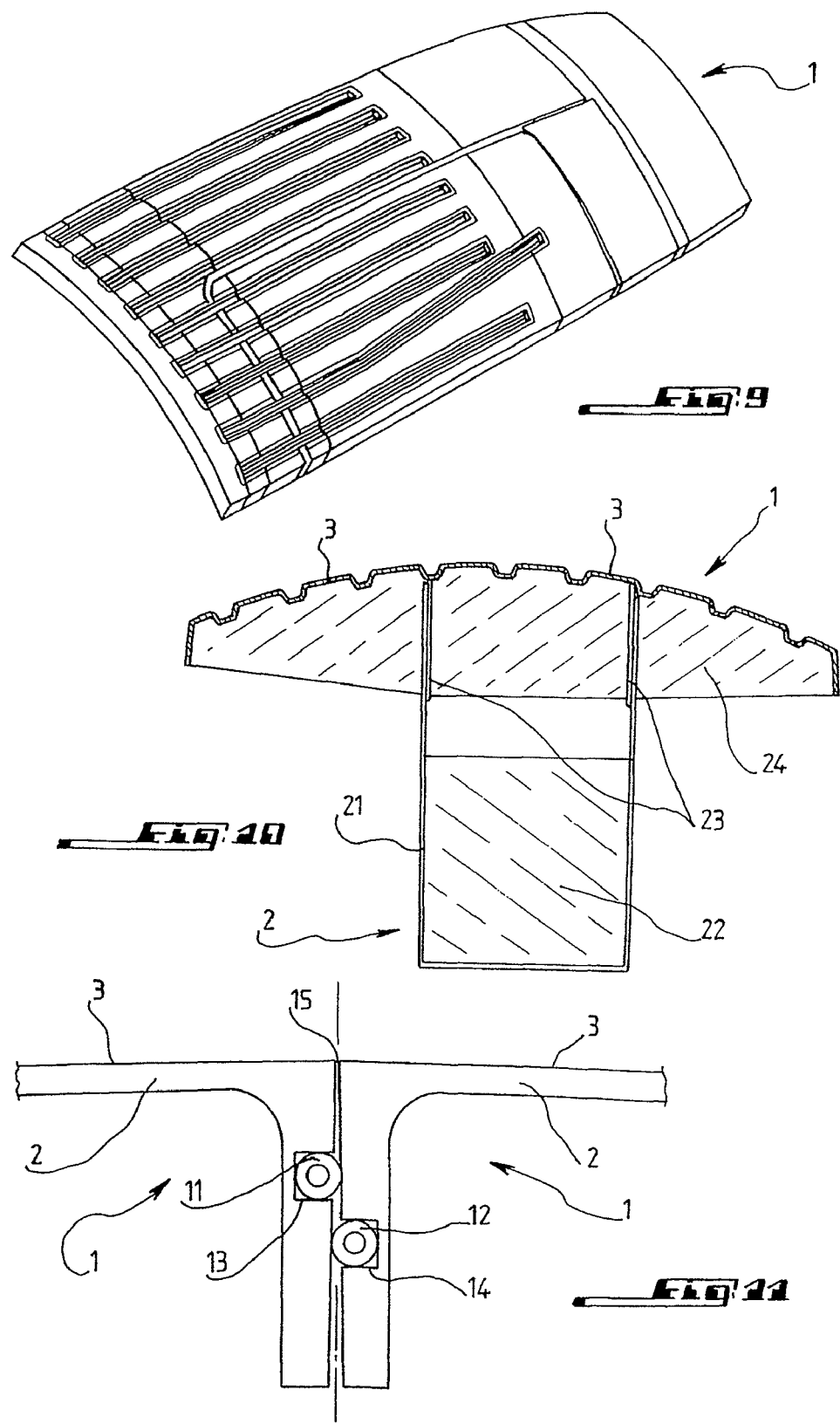

MULTIPLE PART MANDREL

FIELD OF THE INVENTION

The present invention relates to a tool in a composite material for making a cylindrical part in a composite material. The invention also relates to a method for making such a tool.

BACKGROUND

In the aeronautical field, for only mentioning a single field of application, carbon fiber composite parts are increasingly used for obtaining more and more lightweight structures without however abandoning rigidity and other required characteristics, but also for obtaining components which have a more pleasant aspect than a metal part while providing fire resistance.

The making of such composite parts requires high precision tooling. This tooling which may also be called a mold, should both provide the usual functions of any tooling, as recalled hereafter, guarantee geometrical tolerances of the final part and sometimes withstand rather particular thermal and pressure cycles such as those which are involved for example upon passing into an autoclave.

Usually, metal molds made in Invar steel by sheet metal work and machining or composite molds made in carbon fibers pre-impregnated with epoxy resin by molding in a mold called the "master", are used for this purpose.

Although the Invar technology is widely used in mass production, it is nevertheless a fact that the unit cost of such a mold is high. In return, toolings made in carbon fibers are less expensive, but they are more fragile and practically unrepairable, and this mainly because of problems of leaks which subsist after their repair.

When the matter is of making cylindrical parts, notably with large dimensions, the problems for their making originate less from their size and from difficulties in handling such molds, but rather from the difficulty of guaranteeing the final geometrical tolerances of the part, because the latter depend on the behaviour of the mold during the polymerization cycle and also very strongly depend on the structure of the part to be obtained and on its behaviour on its tooling. Indeed, the problems resulting from thermal expansion and shrinkage of the resin are often not negligible.

In such a situation, only a machining approach would provide a guarantee on the final tolerances of the part.

There are composite materials which, molded and polymerized at a high temperature and under high pressure in an autoclave, may then be machined in order to obtain the desired geometry, while retaining the required seal for making the final part. However, such materials require the making of a "master" capable of withstanding the temperature and pressure conditions of their polymerization in an autoclave. Such "masters" are all the more costly and complex since the structure to be made is of large dimensions and that geometrical requirements are strict. As an example, tolerances of +/−0.6 mm for a diameter of the part of 4 m are frequently conditions to be met. Further, segmentation of tooling into several petals for allowing removal from the mold makes this use even more problematic.

As indicated at the beginning of this description, making a composite part in carbon fibers impregnated with epoxy resin requires high precision tooling, which should provide the usual functions of any precision tooling. In the field of interest here, the tooling should allow draping of a stiffened skin with profiles of the n type by depositing fibers. The tooling should also be able to be extracted from the draped structure after polymerization. Further, the tooling should comply with the required tolerances and should provide for holding stiffeners and their cores. Finally, the surface for depositing the fibers should be leakproof at room temperature and at high temperature in an autoclave in order to be able to place a vacuum bag during polymerization. The tooling should also allow attachment of cauls or counter-molds (caul plates) for the polymerization phase. And finally, the tooling should withstand the environment conditions of the method for making the part.

Moreover, a composite tooling intended for making a cylindrical part in a composite material should include thermocouples, should have a contact surface with a maximum roughness of Ra=0.8 and should integrate overlengths required for trimming the required part.

SUMMARY OF THE INVENTION

The object of the invention is to propose tooling which fulfils various conditions stated hereinbefore and which is easy to handle, notably during extraction of the tooling from the draped structure after polymerization.

The object of the invention is achieved with a tool in composite material for making a cylindrical part in a composite material, the tool being intended to form a mandrel on which the cylindrical part will be formed.

According to the invention, the tool comprises a set of components, each of which forms a cylindrical sector of the tool, each of the components including a bearing structure in fiber composite and a skin molded on the bearing structure, the tool further including sealing means intended to be placed at the junctions between the components of the tool.

The tooling of the invention thus consists of a set of mechanically assembled components and which may be disassembled component by component, according to a specific sequence, which allows removal of the finished part from the mold. Each of the components of such a tool which are also called "tiles" is advantageously made in the following way:

a standard bearing structure in carbon fiber composite is made. This may be achieved according to a standard method consisting in using a standard extrudable foam and paste "master" and machining; such a master is not very expensive because does not need to be very precise;

baking the bearing structure in a vacuum oven (therefore not in an autoclave) at a low temperature of the order of 40° C./45° C., followed by a cycle of post-baking providing high temperature strength;

the bearing structure may be self-stiffened so as to withstand mechanical stresses during application of the tooling; among these mechanical stresses, let us more particularly note those involved by draping, during the polymerization in an autoclave, during handling operations, and during disassembly and reassembly of the tool;

a skin in carbon fibers pre-impregnated with an epoxy resin or a skin in carbon fibers pre-impregnated with a polyimide, notably bismaleimide, resin, of small thickness will be molded on the bearing structure, baked in the autoclave in vacuo and under pressure and at a high temperature in order to obtain the required mechanical properties and the expected homogeneity of materials. The bearing structure allows this application.

With reworking by re-machining the thereby achieved skin, it is possible to obtain the desired geometry as well as the integration of the components for obtaining the seal at the interfaces.

A tooling made in the fashion described hereinbefore and which may be taken apart, tile by tile, according to a specific sequence, allows removal from the mold of the finished part regardless of the dimensions of the latter.

Let us more particularly note that the number of components which make up the tooling of the invention entirely depends on the dimensions of the part to be made and on certain handling constraints of each of the components. The exemplary embodiment described further on has tooling consisting of seven tiles, an arbitrarily selected number which therefore is by no means limiting or preferential.

The solution of the invention is particularly suitable for development toolings, but it may also be applied for mass production toolings. Indeed, the material used for making the skin allows reworking operations and repairs which may be made necessary during the lifetime of the tooling, for example as a result of impacts or of any type of damage or by wear.

According to the selected embodiment of the tooling of the invention, the latter may have the additional features hereafter, considered separately or according to all the technically possible combinations:

each of the components includes a bearing structure in carbon fiber composite;

each of the components includes a skin in carbon pre-impregnated with epoxy resin;

each of the components includes a skin in carbon pre-impregnated with a polyimide structure resin;

each of the components includes a skin in carbon pre-impregnated with bismaleimide;

each of the components includes a skin having undergone after molding and baking, machining providing the component with predetermined dimensions and the skin with a predetermined surface condition;

the sealing means include O-ring gaskets;

the sealing means include inflatable silicone O-ring gaskets;

the tool comprises leakproof inserts intended to be placed at the junctions of the components on the side of the skin.

The object of the invention is also achieved with a method for making a tool in a composite material for making a cylindrical part in a composite material, the tool comprising a set of components, each of which forms a cylindrical sector of the tool.

According to the invention, the method comprises at least the following steps:

making a predetermined number of components including a bearing structure in fiber composite, molding a skin on the bearing structure, baking the components, machining the skin of each of the components, in order to provide each of the components with predetermined dimensions and the skin with a predetermined surface condition.

The skin sectors of the tooling consist of a composite based on webs of carbon fibers pre-impregnated with resin and deposited along a quasi-iso draping plane.

When pre-impregnation is accomplished with a tooling resin, with the skin it is not possible to directly obtain by molding the required geometry tolerance and neither allows any re-working by machining for guaranteeing a satisfactory surface condition as regards the required surface roughness and seal. For this reason, the skin is covered with a (quasi-iso) layer in composite of the Hextool® type from Hexcel, a composite material which has excellent characteristics with respect to surface roughness and seal.

Advantageously, the skin is made with an overthickness, with 1-2 mm so that the finished rib may be re-machined after making and inspecting a first part. The recommended thickness of the skin is of the order of 10 mm.

In the appended drawings, a sequence of figures illustrates the removal kinematics for different components or tiles of tooling of the invention from a part made by means of this tool. More particularly, it is seen therein that with the design of this invention it is possible to free and extract the components one by one. At no moment of the sequence, does the surface of the skins of different components cut the surface of the produced part. The means to be applied for carrying out this mandrel removal operation should of course be adapted to the use of the tooling and to the required production rates.

As the performance of the seal of the tooling is essential as regards the quality of the part to be produced, this seal is adapted to the concept of retained cylindrical sectors for ensuring mandrel removal, as well as to the method for making the part.

The solution proposed within the scope of the present invention consists of using two O-ring gaskets positioned at a distance from the skin of each of the components and at different levels. With the solution of a dual O-ring gasket, it is possible to continuously check the validity of the seal barrier. Further, with this solution it is possible to correct vacuum variations during the method for producing the composite part.

Additionally, it is possible to use O-ring gaskets full with Viton or silicone, since the latter are provided for operating at high temperatures such as those provided in an autoclave. However, because of the contemplated plays, it is possible that the seal be not provided at each of the operations for making a cylindrical composite part. For this reason, it is preferable to take inflatable silicon O-ring gaskets.

The most stressed O-ring gasket during the making of the part is the inner gasket, because it is subject to the pressure of the autoclave on the one hand, which is of the order of 8 bars, and it is subject to vacuum on the other hand, which is of the order of 50 mbars. Under these conditions, two tubular inflatable gaskets with an outer diameter of 16 mm may be used for example. The grooves intended to receive these gaskets are machined in opposition in order not to weaken the skin, as this is illustrated in the appended drawings. Advantageously, the inner gasket should be able to be inflated at a pressure of the order of 10 bars.

The use of inflatable gaskets provides the required seal for the tooling of the invention. However, this use is not without any impact on the dimensioning of the skin of each of the components and of the bearing structure. Indeed, the inflatable gaskets induce very significant stresses on the longitudinal walls of the skin. Indeed, considering that the pressure of the gasket is applied on about 50% of the groove, the force generated on the edge of a skin with a length of 6,000 mm is of the order of about 50,000 N. Depending on the geometry of the skins, these forces induce torsional and flexural moments in the bearing structure which should have consequent dimensions.

The validity of the strength of the seal with regard to the pressure in the autoclave is advantageously checked before entering the part into the autoclave, by inflating the inter-gasket space to a pressure of 8 bars.

Managing the interface between the skins of two adjacent components and the inflatable gaskets and the vacuum cover is also very important for ensuring that the vacuum is maintained during polymerization. For this purpose, a possible solution consists of placing at each junction of two adjacent elements, at the skin end, a leakproof insert allowing the passage of the inflatable gasket which is covered by the vacuum cover.

The tooling of the invention has the following advantages:

the tool of the invention is an economical solution for making available large size tooling for making parts of a composite structure of very large size with very high geometrical precision;

the tool of the invention includes a structure in carbon fibers pre-impregnated with epoxy resin, allowing low temperature polymerization, followed by post-baking;

the tool of the invention comprises a coating in a composite of carbon fibers pre-impregnated with an epoxy resin or with a polyimide structure resin, notably in bismaleimide, so that the surface of the tool may be machined without deforming it and while retaining the homogeneity and the seal of the material;

the tool may be repaired according to a simple procedure which may be individually applied to each component of the tool;

the toughness of the surface material of the tool allows the latter to be used for several hundred cycles;

with the architecture of the tool of the invention, by which the central portion of the tool is entirely freed, mechanization of the handling of the components of the tool may be provided, in order to facilitate the mandrel removal operation and the mandrel re-assembling operation and thereby reduce the duration of these operations for mass productions.

BRIEF DESCRIPTION OF DRAWINGS

Other characteristics and advantages of the present invention will become apparent from the description hereafter of an embodiment of the tool of the invention. The description is made with reference to the drawings wherein FIGS. 1-8 illustrate a tool according to a preferred embodiment of the invention and the kinematics of its disassembling, i.e.

FIG. 1 illustrates the tool with a first component freed in order to be extracted, FIG. 2 illustrates the extraction of the first component of the tool of the invention, FIG. 3 illustrates the tool of a second component freed in order to be extracted, FIG. 4 illustrates the extraction of the second component of the tool of the invention, FIG. 5 illustrates the tool with the last three components, the last but two component of which is freed in order to be extracted, FIG. 6 illustrates the extraction of the last but two component of the tool of the invention, FIG. 7 illustrates the tool with the last two components, the last but one of which is freed in order to be extracted, FIG. 8 illustrates the extraction of the last but one component of the tool of the invention, FIG. 9 illustrates separately a component of the tool of the invention on the side of the skin of the component, FIG. 10 illustrates the component of FIG. 9 in a cross-sectional view, FIG. 11 illustrates the junction between two adjacent components of the tool of the invention, and FIG. 12 schematically illustrates the positioning of a leakproof insert in a tool of the invention.

DETAILED DESCRIPTION

Figure 12:
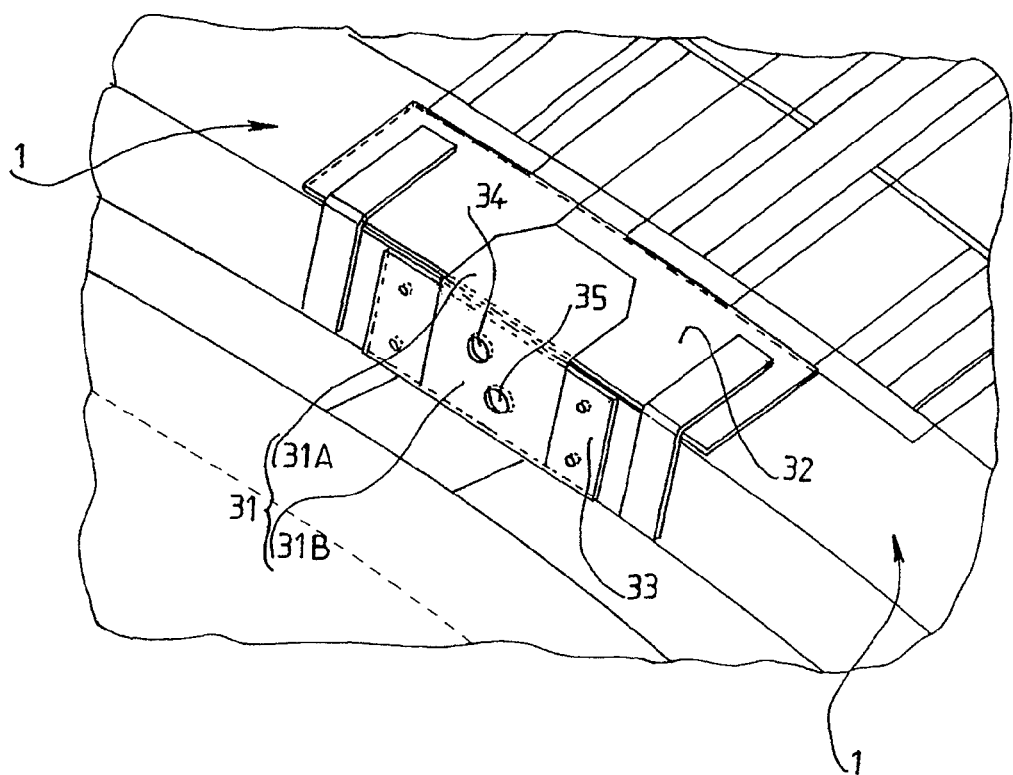

FIG. 1 illustrates a tool in a composite material for making a cylindrical part in a composite material, e.g. for making a fuselage component of an aircraft. The tool, which is itself made as an axisymmetrical cylindrical component, is intended to form a mandrel on which the cylindrical part to be made will be formed.

According to the invention, the tool comprises seven components, each of which forms a cylindrical sector of the tool. The components 1 are conformed in order to be maintained in leakproof contact along the perimeter of the part to be made.

Advantageously, the components 1 of the tool of the invention are all identical with each other when the question is to make axisymmetrical cylindrical parts or with a shape close to that of an axisymmetrical cylinder.

However, the present invention also applies to tools in a composite material with which tubular parts having a non-circular section may be made.

For this reason, the number of components and, if necessary, their shapes are determined for each tool individually.

As shown by the sequences of FIGS. 1-8, the components 1 are not only conformed in order to be able to form a cylindrical mold, but they are also conformed so that they may be freed individually one after the other towards the inside of the tool and be removed without hindering the produced part.

The sequences of FIGS. 1-8 therefore illustrate for four selected components 1 of the tool of the invention how the component is freed towards the inside of the tool and is then extracted from the tool and therefore from the inside of the produced part.

It is easy to imagine that for handling each of the components, and this both for disassembling the mold and reassembling it, hydraulic or differently mechanized means may be used for handling each of the components. Further, provision has to be either made for mechanized means or not, which allow the components to be maintained one after the other until the tool is complete.

The shape of a complete tool of the invention may easily be inferred from FIG. 1; the complete tool is not separately illustrated in the drawing. FIG. 1 illustrates the tool of the invention with a first element 1 freed from the periphery of the tool in order to be extracted from the inside of the produced part (not shown). FIG. 2 illustrates the first component being extracted.

FIGS. 3 and 4 respectively illustrate the second element 1 in the freeing position and being extracted from the inside of the produced part.

FIGS. 5 and 6 illustrate the last three remaining components of the tool of the invention with the fifth of the seven components in a freed position and being extracted, respectively.

And FIGS. 7 and 8 illustrate the next step where there remains only the last two components of the tool of the invention. FIG. 7 illustrates the last but one component in the freeing position and FIG. 8 illustrates the last but one component being extracted.

FIG. 9 illustrates separately a component 1 in a perspective view on its convex face, i.e. on the face intended to be turned towards the part to be produced. More particularly, it is seen in this figure that the surface of the component 1 has all the required grooves or protruding portions and positioned according to the provided geometry in order to allow the desired ribs or recesses to be made on the inner face of the part to be produced.

FIG. 10 illustrates a component 1 in a sectional view relatively to the symmetrical axis of the tool of the invention. More particularly, it is seen therein that the component 1 comprises a bearing structure 2 in a fiber composite, as well as a molded skin 3 on the bearing structure 2. The bearing structure 2 according to the embodiment illustrated in the drawings includes a skin 2 in accordance with the shape inferred from the final shape of the part, a U-shaped beam 21 with a rectangular section, at least one transverse partition 22 in the lower portion of the beam 21, longitudinal shells 23 on the open ends of the beam 21 as well as a transverse shell 24 extending on the entire width of the component 1 and over a height determined by the curvature of the skin 3.

FIG. 11 illustrates the junction between two adjacent components 1. In the side returns of the structure 2 and of the molded skin 3, two inflatable O-ring gaskets 11, 12 are placed in grooves 13, 14 located in opposition and radially shifted relatively to each other. By this arrangement of the invention, each of the two gaskets 11, 12 bears upon the structure of the adjacent component. As an example, inflatable gaskets with an outer diameter of the order of 16 mm may be used and both grooves 13, 14 are alternately distributed on each adjacent tile in order not to weaken the structure.

A space 15 between both adjacent components 1 which appear at the skin of each of the components is advantageously filled with epoxy resin. However, considering the pressures acting during the baking of the produced part, this "filling-up" of the space 15 will not provide any sealing function. The sealing function is therefore entirely achieved by the two inflatable O-ring gaskets 11, 12. Indeed, as an example, during the passage of the part to be produced in the autoclave, the pressure acting on the inner side of the components 1 is of the order of 8 bars, whereas on the side of the skin 3, the vacuum with which a cover is applied onto the part to be produced, as a counter-mold, is only of the order of 50 mbars. Because of these pressure circumstances, the inner gasket 12 is inflated to 125% of the pressure difference between the pressure of the autoclave and the vacuum on the cover, i.e. about 10 bars.

Since the inflatable O-ring gaskets 11, 12 provide the seal of the junction of two adjacent components only in the direction of their longitudinal extension, the seal at the skin end should be provided by additional means. The solution proposed here for such additional means consists of placing a leakproof insert at each junction of two adjacent components at the skin end.

FIG. 12 schematically illustrates the positioning of a leakproof insert 31 in a tool of the invention.

The insert 31 is a right angled part, for example in silicon, positioned with one of its two wings, referenced as 31A, on the skins of two adjacent components 1, 1 and with the other wing, referenced as 31B, transversely relatively to the skins and at the end of the latter. The wing 31A of the insert 31 is covered by the vacuum cover and is maintained in position by a plate 32 for maintaining the cover and the wing 31B is maintained by a plate 33 for maintaining the insert.

The insert 31 moreover comprises two orifices 34, 35 positioned so that they are facing the grooves 13, 14 of both adjacent components 1, 1. These orifices allow the O-ring gaskets 11, 12 to emerge outwards and to then connect them on a high pressure air source so as to be able to inflate each of the two gaskets at the predetermined pressure.

The invention claimed is:

1. A multiple part mandrel for forming a hollow body, the multiple part mandrel comprising:
    a plurality of sectors, each sector having an outer face, a skin on the outer face, a bearing structure extending from an inner face, and a pair of opposed side returns at longitudinal sides of the sector, wherein
        the mandrel is symmetrical about a central axis defining an axial direction of the mandrel, when the sectors are assembled so that the side returns of adjacent sectors face each other,
        each of the side returns includes a recess in an outside surface of the respective side return, spaced from the skin of the respective sector, and an inflatable O-ring disposed in each of the recesses, and
        the recesses of the adjacent side returns in the mandrel are offset with respect to each other in a radial direction of the mandrel, wherein inflation of the inflatable O-rings urges adjacent sectors together at the skins of the sectors, to seal the adjacent sectors of the mandrel at the skins of the adjacent sectors.

2. The mandrel according to claim 1, wherein the skin is carbon impregnated with an epoxy resin.

3. The mandrel according to claim 1, wherein the skin is carbon impregnated with a polyimide resin.

4. The mandrel according to claim 3, wherein the skin is carbon impregnated with bismaleimide.

5. The mandrel according to claim 1, wherein the skin, after molding, baking, and machining, has a predetermined surface configuration.

6. The mandrel according to claim 1, wherein the O-rings are silicone.

7. The mandrel according to claim 1 further including leakproof inserts located at junctions of the sectors, at the skin.

8. The mandrel according to claim 1, wherein each of the bearing structures is a carbon fiber composite.

* * * * *